United States Patent
Jabbary et al.

(10) Patent No.: US 7,194,260 B1
(45) Date of Patent: Mar. 20, 2007

(54) SWITCH-BASED C/I MEASUREMENT

(75) Inventors: Ali Jabbary, Roswell, GA (US); Stephen Adrian Rocha, Allen, TX (US)

(73) Assignee: Cingular Wireless II, LLC, Atlanta, GA (US)

( * ) Notice: Subject to any disclaimer, the term of this patent is extended or adjusted under 35 U.S.C. 154(b) by 327 days.

(21) Appl. No.: 10/800,297

(22) Filed: Mar. 11, 2004

(51) Int. Cl.
*H04Q 7/20* (2006.01)
(52) U.S. Cl. ............... 455/423; 455/67.11; 370/251
(58) Field of Classification Search ............... 455/423, 455/424, 425, 67.11, 67.4, 67.6, 226.1, 435.2, 455/452.2, 446, 437, 447, 67.14; 370/251, 370/252, 253
See application file for complete search history.

(56) References Cited

U.S. PATENT DOCUMENTS

| | | | |
|---|---|---|---|
| 5,913,162 A * | 6/1999 | Gourdin et al. | 455/424 |
| 6,052,583 A * | 4/2000 | Bernardin | 455/423 |
| 6,052,584 A * | 4/2000 | Harvey et al. | 455/423 |
| 6,411,798 B1 * | 6/2002 | Frenkel et al. | 455/67.14 |
| 6,603,966 B1 * | 8/2003 | Sheffield | 455/423 |
| 6,714,779 B2 * | 3/2004 | Hall et al. | 455/423 |
| 6,853,842 B1 * | 2/2005 | Wilson et al. | 455/423 |
| 2003/0087635 A1 * | 5/2003 | Sheffield | 455/423 |
| 2005/0048966 A1 * | 3/2005 | Semper | 455/425 |

* cited by examiner

Primary Examiner—CongVan Tran
(74) Attorney, Agent, or Firm—Parks Knowlton LLC; Paul E. Knowlton, Esq.; Robert Z. Evora

(57) ABSTRACT

A system and method for generating a switch-based C/I matrix for a wireless network is provided. A cell-under-test (CUT) may broadcast system unique carrier and interference signals to mobile stations serviced by the CUT and mobile stations serviced by measurement sectors of other cells in the wireless network. The mobile stations make downlink signal strength measurements, and transmit the signal strength measurements to the corresponding sectors and CUT that service the mobile stations. The measurement sectors may be further configured to measure signal strength of the interference signals transmitted from the CUT on the uplink. The signal strengths are then processed to generate the switch-based C/I matrix.

20 Claims, 5 Drawing Sheets

| CUT | Carrier | Measurement Sectors | | | | | |
|---|---|---|---|---|---|---|---|
| | | 2A | 2B | 2C | 3A | 3B | 3C |
| 2A | $C_{2A}$ | - | - | - | $C_{2A}/I_{2A}^{3A}$ | $C_{3B}/I_{2A}^{3B}$ | $C_{3C}/I_{2A}^{3C}$ |
| 2B | $C_{2B}$ | - | - | - | $C_{3A}/I_{2B}^{3A}$ | $C_{3B}/I_{2B}^{3B}$ | $C_{3C}/I_{2B}^{3C}$ |
| 2C | $C_{2C}$ | - | - | - | $C_{3A}/I_{2C}^{3A}$ | $C_{3B}/I_{2C}^{3B}$ | $C_{3C}/I_{2C}^{3C}$ |
| 3A | $C_{3A}$ | $C_{2A}/I_{3A}^{2A}$ | $C_{2B}/I_{3A}^{2B}$ | $C_{2C}/I_{3A}^{2C}$ | - | - | - |
| 3B | $C_{3B}$ | $C_{2A}/I_{3B}^{2A}$ | $C_{2B}/I_{3B}^{2B}$ | $C_{2C}/I_{3B}^{2C}$ | - | - | - |
| 3C | $C_{3C}$ | $C_{2A}/I_{3C}^{2A}$ | $C_{2B}/I_{3C}^{2B}$ | $C_{2C}/I_{3C}^{2C}$ | - | - | - |
| 4A | $C_{4A}$ | $C_{2A}/I_{4A}^{2A}$ | $C_{2B}/I_{4A}^{2B}$ | $C_{2C}/I_{4A}^{2C}$ | $C_{3A}/I_{4A}^{3A}$ | $C_{3B}/I_{4A}^{3B}$ | $C_{3C}/I_{4A}^{3C}$ |
| 4B | $C_{4B}$ | $C_{2A}/I_{4B}^{2A}$ | $C_{2B}/I_{4B}^{2B}$ | $C_{2C}/I_{4B}^{2C}$ | $C_{3A}/I_{4B}^{3A}$ | $C_{3B}/I_{4B}^{3B}$ | $C_{3C}/I_{4B}^{3C}$ |
| 4C | $C_{4C}$ | $C_{2A}/I_{4C}^{2A}$ | $C_{2B}/I_{4C}^{2B}$ | $C_{2C}/I_{4C}^{2C}$ | $C_{3A}/I_{4C}^{3A}$ | $C_{3B}/I_{4C}^{3B}$ | $C_{3C}/I_{4C}^{3C}$ |

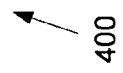

SWITCH-BASED C/I MEASUREMENT

BACKGROUND OF THE INVENTION

1. Field of the Invention

This invention relates generally to wireless networks and more particularly to a system and method for generating switch-based C/I measurements.

2. Description of the Background Art

Commercial wireless telecommunications networks (markets) are divided into a number of contiguous cell sites, wherein each cell site handles voice and data traffic for mobile stations located within the region associated with the cell site. Each cell site (or sector thereof) is assigned a set of frequencies (channels) for carrying voice and data communications and related control information. Due to the limited number of available channels and high call traffic, channel sets must be reused throughout a network, such that multiple cell sites simultaneously use the same frequencies for voice and data communications. To analyze and optimize frequency reuse schemes, network engineers use various methods to determine channel interference between cells, or sectors of cells, in wireless networks. Methods such as carrier/interference (C/I) histograms, bit error rate analysis, voice quality analysis, and engineering intuition are used to characterize the impact of frequency reuse in neighboring cells on voice and data communication quality. C/I measurements are typically collected via drive testing (i.e., measuring signal strengths while driving through various cell sites), or via the use of propagation tool modeling. However, drive testing is a time consuming and resource intensive endeavor, and the propagation tools may generate erroneous data and predictions.

It would thus be desirable to provide a system and method that allows a network engineer to accurately, inexpensively and efficiently collect and process C/I measurements, which may then be utilized for generating frequency-reuse distribution plans in a wireless market.

SUMMARY OF THE INVENTION

In accordance with embodiments of the present invention, a method for collecting C/I measurements utilizes downlink carrier and interference signal strength measurements made by mobile stations in the course of normal operation. The method comprises an initial step of designating one or more cell sites in a wireless network as cell-under-test (CUT) sites and assigning system-unique analog frequencies to the carrier signals and system-unique DCCH frequencies to the interference signals at each of the designated CUT sites. Sectors of cell sites located adjacent or proximal to the CUT site are designated as measurement sectors, and signal strength measurements performed by mobile stations serviced by the measurement sectors are utilized to estimate interference signal strength, in the manner described below. The CUT site is then configured to broadcast carrier signals and interference signals at the system-unique frequencies.

Mobile stations serviced by the CUT site (or sectors of the CUT) may then receive and measure downlink signal strengths of the carrier signals, and transmit the measured signal strengths to the CUT. In addition, mobile stations serviced by the measurement sectors may receive and measure downlink signal strengths of the interference signals, and transmit the measured signal strengths to the measurement sector that correspondingly services each mobile. Alternatively, base stations associated with the measurement sectors may receive the interference signals on the uplink from the CUT, and measure the signal strengths. The method then repeats transmission and measurement of carrier and interference signals for each designated CUT site to generate carrier and interference signal strength data. In one embodiment of the invention, the signal strength data is then statistically processed to generate a C/I matrix.

In a further embodiment of the invention, the method for configuring the system-unique frequencies for a designated CUT site comprises removing DCCH frequencies from service in the wireless network, retuning the removed DCCH frequencies to system-unique DCCH frequencies, and restoring the system-unique DCCH frequencies to service. Furthermore, the method may include execution of an operational script that prohibits mobile stations in the wireless network from using the system-unique DCCH frequencies for voice communication.

A system for a switch-based C/I matrix according to an embodiment of the present invention may comprise a CUT site configured to broadcast system-unique carrier signals and system-unique interference signals. The system may further include mobile stations to receive, measure, and transmit signal strengths of the system-unique carrier signals and the system-unique interference signals. The mobile stations may transmit the signal strengths to measurement sectors and the CUT site. A measurement sector is typically configured to receive the transmitted signal strengths of the system-unique interference signals from a first set of mobile stations located within an area serviced by the measurement sector. Similarly, the CUT site is configured to receive the transmitted signal strengths of the system-unique carrier signals from a second set of mobile stations located within an area serviced by the CUT site. In a further embodiment of the invention, the measurement sectors are configured to receive the system-unique interference signals from mobile stations serviced by the CUT site, and measure the signal strengths.

Additionally, the system may comprise a processor configured to receive the signal strength data from one or more CUT sites and the measurement sectors, perform statistical analyses on the data, and generate a C/I matrix based upon ratios of the carrier signal strengths to interference signal strengths.

BRIEF DESCRIPTION OF THE DRAWINGS

FIG. 4 is a portion of a C/I matrix generated by switch-based C/I measurements.

DETAILED DESCRIPTION OF THE DRAWINGS

Figure 1:
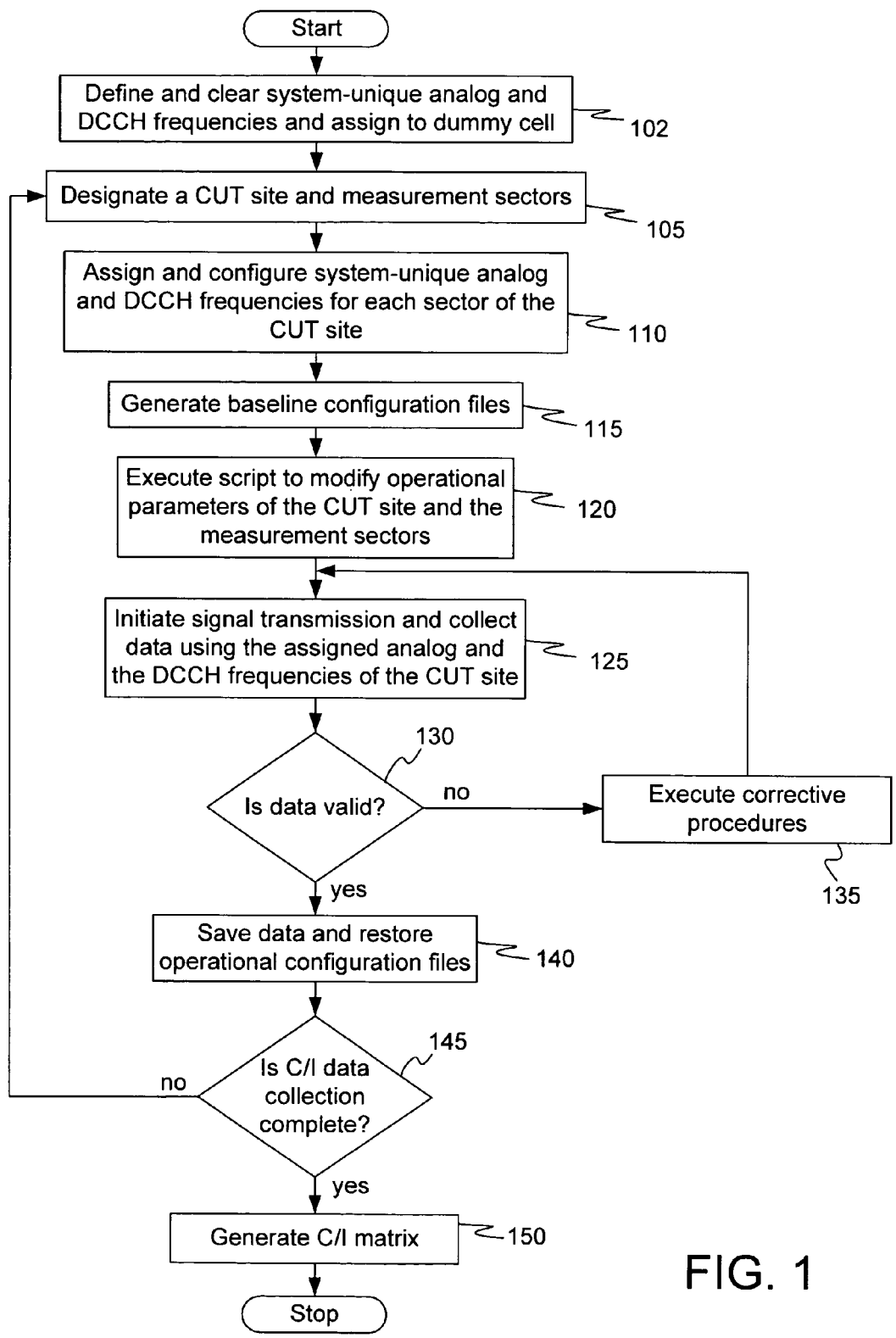
FIG. 1 is a flowchart depicting steps of a method for generating a switch-based C/I matrix, according to one embodiment of the present invention.

FIG. 1 is a flowchart depicting steps of a method for generating switch-based C/I measurements, according to one embodiment of the present invention. FIG. 1 may best be explained and understood with reference to FIG. 2, which is a symbolic diagram of an exemplary wireless network 200 configured to make switch-based C/I measurements in accordance with the method depicted in FIG. 1. The wireless network 200 may utilize Lucent's Flexible Channel Allocation (FLCA) feature and time-division multiple access (TDMA) as a preferred method of resource allocation, however the scope of the present invention covers other resource allocation methods, such as frequency-division multiple access (FDMA) or code-division multiple access (CDMA). In addition. it should be understood that the form and configuration of the wireless network 200 depicted herein and described below is intended as illustrative rather than as limiting application of the method of the invention to a network of particular size or description.

In step 102, system-unique analog and DCCH channels are defined and cleared throughout the wireless network 200 (or at least the portion(s) thereof undergoing testing). A dummy cell is then created in the central computer 225 software and assigned the system unique DCCH channels. The system-unique DCCH channels are used solely for measurement of interference signal strengths, and mobile stations serviced by the CUT site and measurement sectors are prevented from using the system-unique DCCH channels for call traffic by inclusion of the channels on the FlexChan interfering neighbor (FIN) lists, in the manner described below. The number of system-unique DCCH channels that must be defined and cleared is at least equal to the number of sectors of the CUT site which are concurrently tested; for example, if C/I measurements are to be concurrently performed on all three sectors of a CUT site, then at least three system-unique DCCH channels must be defined and cleared.

Figure 2:
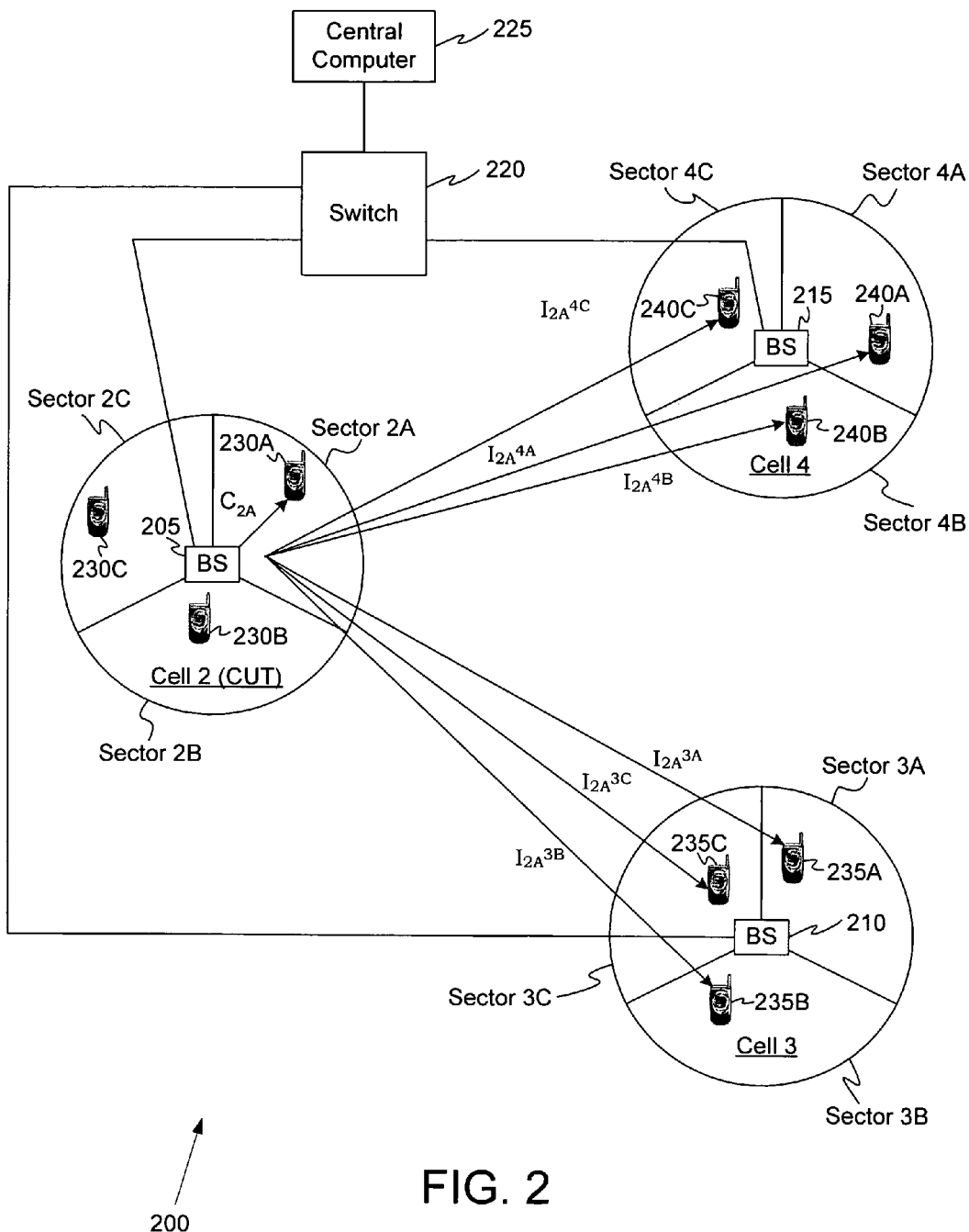
FIG. 2 is a symbolic diagram of a wireless network configured to make switch-based C/I measurements, in accordance with the method depicted in FIG. 1.

In step 105, a system administrator, a network engineer, or a central computer linked to the wireless network 200 designates cell-under-test (CUT) sites and measurement sectors. In the FIG. 2 example, the wireless network 200 includes a cell 2 with sectors 2A, 2B, and 2C; a cell 3 with sectors 3A, 3B, and 3C; and a cell 4 with sectors 4A, 4B, and 4C. The wireless network 200 also comprises base stations 205, 210, and 215, a switch 220 coupled to the base stations 205, 210 and 215, and a central computer 225 coupled to the switch 220. A typical base station may be equipped with a transceiver, signal processing hardware and software, and an antenna for communication with mobile stations located within a sector serviced by the base station. It is noted that FIG. 2 illustrates only one base station per cell for purposes of diagrammatic simplicity. However, base station 205, for example, typically comprises three component base stations (205A, 205B, 205C), each of which service mobile stations located within a corresponding sector of cell site 2. In the present example, base station 205A services mobile stations 230A located within the sector 2A, base station 205B services mobile stations 230B located within the sector 2B, and base station 205C services mobile stations 230C located within the sector 2C. Similarly, each of base stations 210 and 215 typically comprise three component base stations, each of which service mobile stations located within a corresponding sector. The central computer 225 may be an operation and maintenance processor (OMP), and the switch 220 may be a mobile switching center (MSC), a gateway mobile switching center (GMSC), or other type of wireless network switch.

Mobile stations 230A–C will typically be in the form of PCS or cellular telephones operated by customers of the wireless network 200 vendor. As will be discussed in further detail below, the present method utilizes the signal measurement data produced by mobile stations during normal commercial usage (e.g., initiating and receiving telephone calls) to generate C/I values. This method is distinguishable from drive tests, wherein the signal measurements are performed by wireless system personnel using special equipment.

Referring again to step 105, the central computer 225 (or the switch 220) designates cell 2 as a CUT site, for example. The sectors of the cells in the wireless network 200 not designated as the CUT site (e.g., sectors of cell 3 and cell 4 in the FIG. 2 embodiment) are referred to as measurement sectors. It should be noted that a typical wireless network may have thousands of cells, however, for brevity and clarity, only three cells are illustrated in the wireless network 200 of FIG. 2.

In one implementation of the invention, the central computer 225 may identify a maximum of 256 measurement sectors, although the scope of the present invention covers any number of measurement sectors. The measurement sectors will typically represent sectors of cell sites located proximate to the site designated as the CUT. The central computer 225 may employ any suitable criteria or plan to designate a cell in the wireless network 200 as a CUT site. For example, the central computer 225 may designate CUT sites based upon hardware availability, proximity of cells to one another, traffic patterns, availability of system-unique frequencies, frequency-reuse and distribution plan prototypes, network reconfiguration schemes, and new cell site feasibility studies. It should also be noted that multiple cell sites may be concurrently designated as CUT sites in a wireless system. For ease of explication, however, the examples presented herein have a single cell site designated as the CUT site.

Next, in step 110, the central computer 225 (or the switch 220) assigns system-unique analog and DCCH frequencies to each sector of the CUT site, and then configures the assigned analog and DCCH frequencies. In the present example, the central computer 225 assigns system-unique analog and DCCH frequencies to sectors 2A, 2B, and 2C of cell 2. As discussed above, the system-unique analog and DCCH frequencies are selected such that they are not used in the wireless network 200 (or, at a minimum, in the CUT site and measurement sectors) as commercial traffic channels during transmission of carrier and interference signals (i.e., during C/I testing). After assigning the system-unique frequencies, the central computer 225 configures the assigned analog and DCCH frequencies for sectors 2A, 2B, and 2C. Frequency configuration may include retuning commercially active DCCH frequencies to system-unique frequencies and keying-up (powering on) an analog radio for transmission at a system-unique analog frequency. In the present example, the central computer 225 may temporarily remove a DCCH channel (i.e., frequency) from active wireless communication from each sector of the CUT (i.e., sectors 2A, 2B, and 2C), retune the removed DCCH channels to the assigned system-unique frequencies for each CUT sector, and then restore the retuned channels to active wireless operation after C/I testing using cell 2 as the CUT site is complete. The central computer 225 may also remove, retune, and restore analog channels in any cell sectors outside of the CUT sectors that use the system-unique analog frequencies assigned to sectors of the CUT. Frequency configuration may also include adjusting analog radio hardware or software corresponding to analog radio transmitters to tune analog radio frequencies to the assigned system-unique analog frequencies.

In step 115, the central computer 225 generates baseline configuration files for the CUT and the measurement sectors. In one embodiment of the invention, the baseline configuration files are copies of the operational configuration files of the CUT and the measurement sectors. A baseline configuration file typically includes data and parameters, such as a channel set long list, a channel set short list, an interfering neighbor list, and a mobile-assisted handoff list. The lists will be described in more detail further below in conjunction with FIG. 5.

Next in step 120, the central computer 225 executes scripts (or instructs base stations 205, 210, and 215 to execute scripts) to modify lists and parameters of the operational configuration files corresponding to the CUT sectors 2A–2C and the measurement sectors 3A–4C, in preparation for carrier signal and interference signal transmission and data collection (i.e., C/I testing). Step 120 is further discussed in more detail below in conjunction with FIG. 5.

In step 125, the central computer 225 initiates signal transmission using the assigned system-unique analog and DCCH frequencies of the CUT sectors 2A, 2B, and 2C. For example, at a predetermined time and for a predetermined duration, the central computer 225 may instruct each sector of cell 2 to transmit a continuous wave signal (also referred to as a carrier signal C) at the system-unique analog frequency, and a signal at the system-unique DCCH frequency (also referred to as an interference signal I). For purposes of clarity, the FIG. 2 embodiment of the present invention only illustrates a transmission of a carrier signal $C_{2A}$ and an interference signal $I_{2A}$ from sector 2A, and does not illustrate a transmission of system-unique analog and DCCH signals from sectors 2B and 2C. However, in one embodiment of the invention, all three sectors of the CUT (i.e., sectors 2A, 2B, and 2C) transmit analog carrier signals and DCCH interference signals simultaneously. In this case, each sector of the CUT is assigned a different set of system unique analog and DCCH frequencies.

The following notation scheme is employed herein to identify different signals. A subscript to the carrier signal C designates a broadcast sector of the carrier signal C. For example, carrier signal $C_{2A}$ is broadcast from sector 2A. Similarly, a subscript to the interference signal I designates a broadcast sector of the interference signal, and a superscript to the interference signal I designates a sector in which the interference signal is received. For example, interference signal $I_{2A}^{4C}$ designates that the interference signal is broadcast from sector 2A and received in sector 4C, as illustrated in FIG. 2.

After the central computer 225 initiates signal transmission of the assigned system-unique frequencies to sector 2A, for example, the mobile stations 230A serviced by sector 2A receive and measure downlink signal strength of the carrier signal $C_{2A}$. The mobile stations 230A then transmit the measured downlink signal strengths of the carrier signal $C_{2A}$ to the base station 205 (i.e., to the base station 205A that services the mobile stations 230A). In addition, mobile stations 235 and 240 serviced by the measurement sectors of cells 3 and cell 4, respectively, receive and measure downlink signal strength of the interference signal $I_{2A}$ broadcast by sector 2A. The mobile stations 235 and 240 then transmit the measured downlink signal strengths of the interference signal $I_{2A}$ to the base stations 210 and 215, respectively, of the corresponding measurement sectors (i.e., sectors 3A, 3B, 3C, 4A, 4B, and 4C). This embodiment of the invention may be referred to as a downlink/downlink switched-based C/I measurement, since the carrier signal $C_{2A}$ is measured by mobile stations 230A serviced by the CUT sector 2A on the downlink, and the interference signal $I_{2A}$ is measured by mobile stations 235 and 240 serviced by the measurement sectors of cells 3 and 4, respectively, on the downlink. It should again be noted that conventional mobile stations (e.g., cellular or PCS telephones) are configured to perform the signal measurements described herein during normal operations, i.e., during ordinary use by the wireless system customers.

In another embodiment of the present invention, the base stations 210 and 215 of the corresponding measurement sectors of cells 3 and 4 receive on the uplink (i.e., at the receive antennae associated with each measurement sector) the interference signal $I_{2A}$ broadcast by the sector 2A. The base stations 210 and 215 then measure the uplink signal strength of the interference signal $I_{2A}$. This embodiment may be referred to as a downlink/uplink switched-based C/I measurement, since the carrier signal $C_{2A}$ is measured by mobile stations 230A serviced by the sector 2A on the downlink, and the interference signal $I_{2A}$ is measured by base stations 210 and 215 that service the measurement sectors of cells 3 and 4, respectively, on the uplink.

Mobile stations serviced by CUT sectors (such as the mobile stations 230A serviced by sector 2A) are programmed to (during ordinary operation) measure signal strengths and report the measured signal strength to the associated base station at predetermined intervals. For example, the mobile stations may make carrier signal strength measurements on the downlink at one or more predetermined C/I test starting times for a first predetermined time interval, and mobile stations in measurement sectors (such as the mobile stations 235 and 240) may make interference signal strength measurements on the downlink at the one or more predetermined C/I test starting times for a second predetermined time interval. In addition, base stations 210 and 215 of cells 3 and 4, respectively, may make interference signal strength measurements on the uplink at the one or more predetermined C/I test starting times for a third predetermined time interval. In typical operation, the first and second predetermined time intervals are two seconds, and the third predetermined time interval is ten seconds, although the invention should not be construed as requiring any specific time intervals. The mobile stations 230, 235, and 240 transmit the signal strength measurements to the base stations 205, 210, and 215, respectively, for the duration of the C/I test. C/I test durations should be sufficiently long to allow collection of a statistically meaningful set of measurements. The required test duration may depend upon several factors, such as traffic load and distribution, however, a typical C/I test duration will be a few hours for a wireless network having moderate traffic.

Next, in step 130, the signal strength measurement data is either sent to the central computer 225 for analysis, or the base stations 205–215 perform the analysis. In one embodiment of the present invention, the central computer 225 may conduct a mathematical analysis on the data to determine if the data comprises a statistically significant number of samples, and if so, additional statistical analyses may be performed to determine if the data conforms to accepted statistical standards, such as standards of variance and deviation, for example. If the data does not conform to accepted statistical standards, then the central computer 225 declares the data invalid, and in step 135, the central computer 225 executes corrective procedures. The data may be invalid due to a variety of causes, such as faulty mobile transceivers, faulty analog equipment in CUT sectors, natural or man-made interference with transmission of the system-unique analog and DCCH frequencies, or any number of additional causes. The corrective procedures, according to the present invention, include any procedures necessary to alleviate the causes of the invalid data. Once the central computer 225, the switch 220, or network administrator has executed the corrective procedures, the method continues at step 125.

If however, in step 130, the central computer 225 declares the data to be valid, then in step 140 the central computer 225 saves the data in a database (not shown) for future processing, and copies the baseline configuration files to the operational configuration files, thus restoring the operation configuration files to their original operational data content. Next, in step 145, the central computer 225 determines if C/I data collection for the wireless network 200 is complete. If data collection is not complete, then the method continues at step 105, and the central computer designates another cell of the wireless network 200 as a CUT site.

Figure 3:
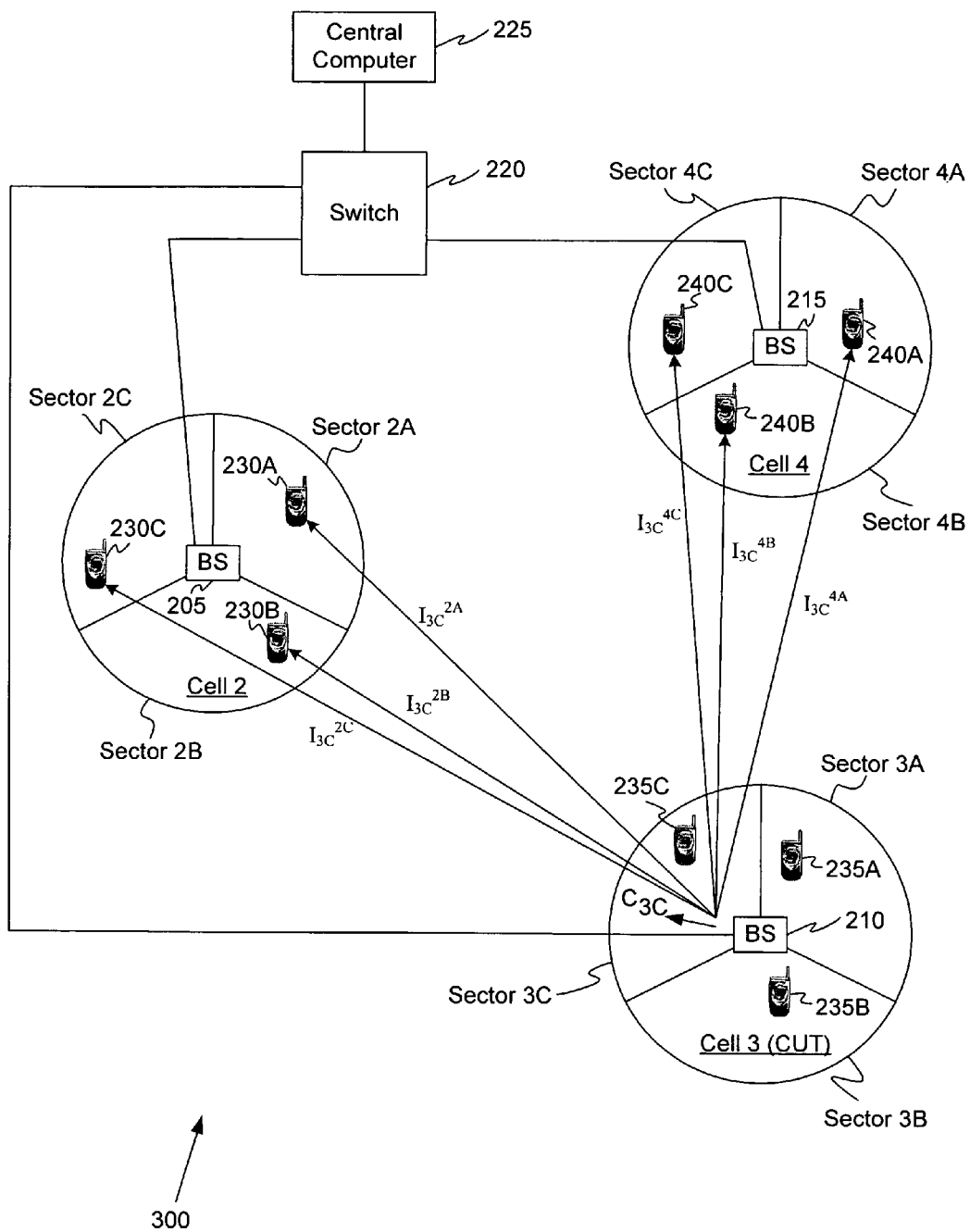
FIG. 3 is a symbolic diagram of the wireless network of FIG. 2, wherein a different cell has been configured as the designated CUT site.

For example, the central computer 225 may designate cell 3 as a CUT site. FIG. 3 is a symbolic diagram of a wireless network 300 configured with cell 3 as the designated CUT site. The central computer 225 then designates sectors 2A, 2B, 2C, 4A, 4B, and 4C as measurement sectors, and assigns and configures system-unique analog and DCCH frequencies to sectors 3A, 3B, and 3C. The system-unique analog and DCCH frequencies assigned to sectors 3A, 3B, and 3C may or may not be the same as the system-unique analog and DCCH frequencies assigned to sectors 2A, 2B, and 2C (FIG. 2). After each test period has been completed, the central computer 225 designates a different cell site as a CUT site, until each of the cell sites of interest (i.e., those cell sites relevant to the frequency reuse planning process) has been designated as a CUT site. As alluded to above, the invention may be implemented in commercial wireless systems having tens or hundreds of cell sites, and so the central computer (or other means for controlling the test process) will typically cycle through steps 105–140 multiple times before C/I data collection is completed.

Referring back to step 145, if the central computer 225 determines that C/I data collection for the wireless network 200 is complete, then in step 150 the central computer 225 generates a switch-based C/I matrix based upon the collected signal strength data stored in the database.

FIG. 4 illustrates an exemplary switch-based C/I matrix 400, generated in accordance with an embodiment of the present invention. The switch-based C/I matrix 400 includes a CUT column comprising sectors 2A, 2B, and 2C of cell 2, sectors 3A, 3B, and 3C of cell 3, and sectors 4A, 4B, and 4C of cell 4, as illustrated in FIG. 2 and FIG. 3. In addition, the switch-based C/I matrix 400 includes a carrier column that comprises values that represent measured carrier signal strengths for each CUT, as determined by the central computer 225. For example, the central computer 225 may implement any number of predetermined statistical algorithms on the downlink carrier signal strength data received from the mobile stations 230A serviced by sector 2A to obtain the carrier signal strength $C_{2A}$. In one embodiment of the present invention, the carrier signal strength $C_{2A}$ may be an average, a weighted average, or a higher order moment of the received downlink carrier signal strength data or of a subset of the received data. For example, extraneous or errant data points, caused by malfunctioning mobile stations, analog signal transmitters, or base stations, may be excluded from a statistical analysis of the data.

The switch-based C/I matrix 400 also comprises measurement sector columns 2A, 2B, 2C, 3A, 3B, and 3C. For simplicity and ease of description, it should be noted that the switch-based C/I matrix 400 does not include measurement sector columns 4A, 4B, and 4C. In addition, the switch-based C/I matrix 400 includes a plurality of C/I matrix values (as illustrated by the darkest shaded region) as generated according to the present invention. For example, when the central computer 225 designates cell 2 as a CUT site (see FIG. 2), then the central computer 225 assigns system-unique analog and DCCH frequencies to each of the sectors 2A, 2B, and 2C, and instructs the sectors 2A, 2B, and 2C to transmit carrier signals at the analog frequency and interference signals at the DCCH frequencies. Mobile stations 230 serviced by the sectors 2A, 2B, and 2C receive and measure the downlink signal strength of carrier signals $C_{2A}$, $C_{2B}$, and $C_{2C}$, respectively, and report the signal strengths to the corresponding base stations (i.e., base stations 205A, 205B, and 205C) of sectors 2A, 2B, and 2C. Furthermore, the mobile stations 235 and 240 serviced by the measurement sectors 3A–3C and 4A–4C, respectively, receive and measure the downlink signal strength of the interference signals transmitted by sectors 2A, 2B, and 2C of cell 2 (i.e., the CUT site). For example, the mobile stations 235A serviced by measurement sector 3A receive and measure the downlink signal strength of interference signals $I_{2A}^{3A}$, $I_{2B}^{3A}$, and $I_{2C}^{3A}$. In addition, the mobile stations 235B serviced by measurement sector 3B receive and measure the downlink signal strength of interference signals $I_{2A}^{3B}$, $I_{2B}^{3B}$, and $I_{2C}^{3B}$, and mobile stations 235C serviced by measurement sector 3C receive and measure the downlink signal strength of interference signals $I_{2A}^{3C}$, $I_{2B}^{3C}$, and $I_{2C}^{3C}$. The mobile stations 235A, 235B, and 235C serviced by the measurement sectors 3A, 3B, and 3C, respectively, then transmit the measured downlink interference signal strengths to the base stations 210A, 210B, and 210C, respectively. In another embodiment of the present invention, the base stations 210A, 210B, and 210C of measurement sectors 3A, 3B, and 3C, respectively, receive and measure the interference signals on the uplink. For example, the base station 2 10A corresponding to the measurement sector 3A receives (on the uplink) interference signals $I_{2A}^{3A}$, $I_{2B}^{3A}$, and $I_{2C}^{3A}$, transmitted from sectors 2A, 2B, and 2C, respectively.

The central computer 225 then processes the signal strength data received from each base station corresponding to CUT sectors and measurement sectors during the C/I interference test to generate the switch-based C/I matrix. For example, as illustrated in FIG. 4, the central computer 225 generates a C/I matrix value for CUT 2A and measurement sector 3A by dividing the carrier signal strength $C_{3A}$ by the interference signal strength $I_{2A}^{3A}$. The central computer 225 similarly computes other C/I matrix values to complete the switch-based C/I matrix 400.

A network engineer or network administrator may set frequency reuse or distribution schemes based upon the C/I matrix 400. For example, the network engineer may set a C/I matrix threshold value. Consequently, a C/I matrix entry corresponding to a given CUT—measurement sector that is less than the threshold value may prohibit the given CUT site and the given measurement sector from sharing a common voice channel. In one embodiment of the invention, the C/I matrix threshold value may be in a range of 12–18 dB, however, the present invention covers any C/I matrix threshold values.

Figure 5:
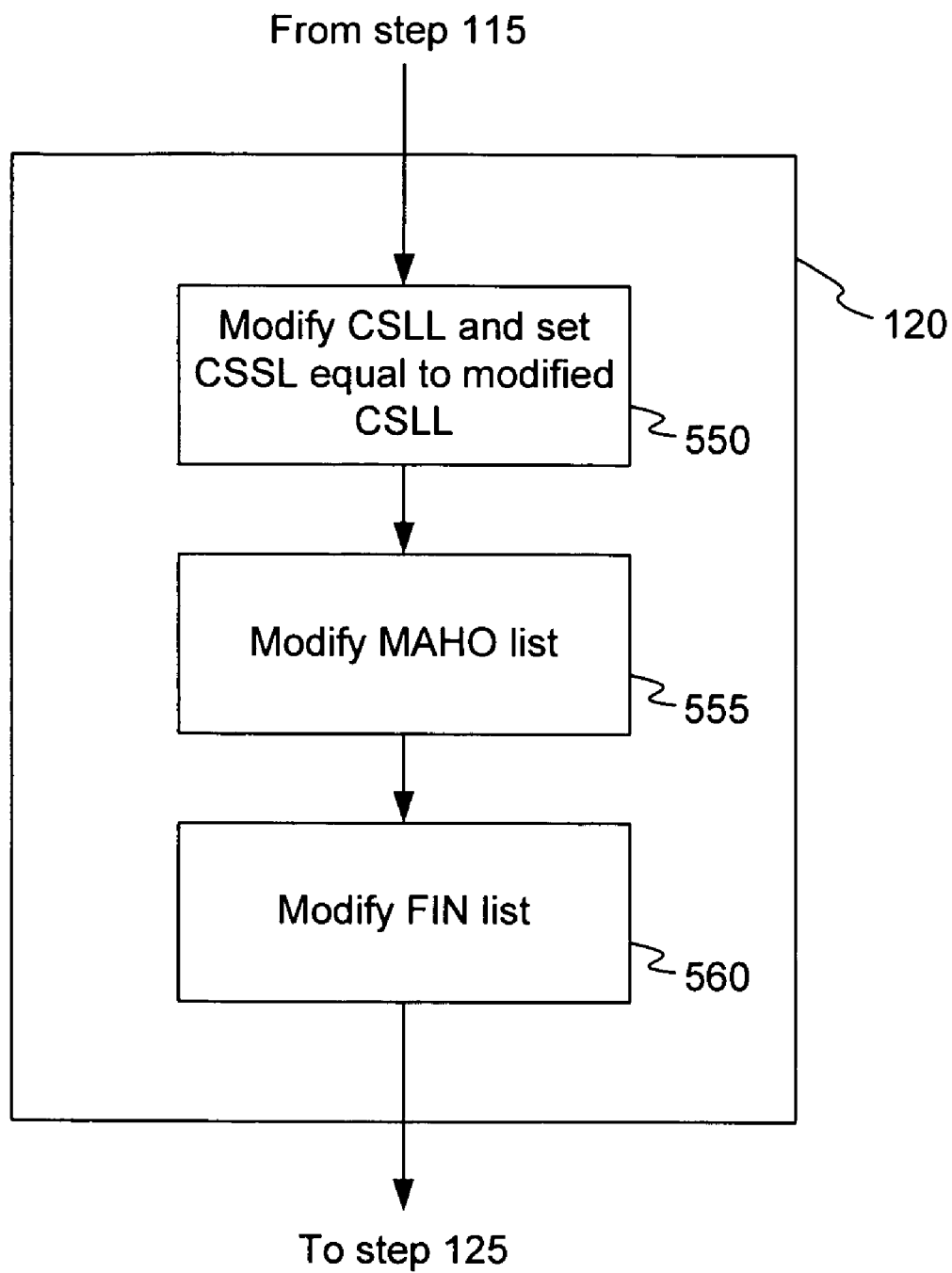
FIG. 5 is a flowchart depicting in further detail a set of steps corresponding to one of the steps in the FIG. 1 flowchart.

FIG. 5 is a flowchart illustrating in greater detail the component steps corresponding to step 120 of FIG. 1. As discussed above, step 120 involves the execution of scripts (by or under the control of the central computer) to modify lists and parameters of the operational configuration files corresponding to the CUT sectors and measurement sectors in preparation for carrier signal and interference signal transmission and data collection (i.e., C/I testing). FIG. 5 may best be understood with reference to the wireless network 200 of FIG. 2, configured with cell 2 as the designated CUT site. In step 550, the central computer 225 modifies, for each CUT sector (i.e., sectors 2A, 2B, and 2C) and all measurement sectors (i.e., sectors 3A, 3B, 3C, 4A, 4B, and 4C), the channel set long list (CSLL), and then sets the channel set short list (CSSL) equal to the modified CSLL. Typically, the CSLL comprises a list of channels that each sector (i.e., base station of a sector and mobile stations serviced by the sector) uses for wireless communication. In addition, each base station of each sector makes channel strength (also referred to as signal strength) measurements of every channel on the CSLL on the uplink, and ranks the channels in strength from strongest to weakest. The CSSL is typically a predetermined subset of the strongest ranked channels of the CSLL. Mobile stations serviced by a given sector and the base station corresponding to the given sector then make downlink and uplink channel strength measurements, respectively, of every channel on the CSSL.

In one embodiment of the invention, the central computer 225 modifies the CSLL to set a maximum number of channels. For example, in an exemplary embodiment, the modified CSLL comprises 30 channels. Next, the central computer 225 adds the system-unique analog channel (i.e., frequency) assigned to each CUT sector (i.e., sectors 2A, 2B, and 2C) to the modified CSLL of each CUT sector, and adds the three system-unique DCCH channels assigned to the CUT sectors 2A, 2B, and 2C to the modified CSLL of each measurement sector. Next, the central computer 225 equates the CSSL to the modified CSLL for each CUT sector 2A, 2B, and 2C, and each measurement sector 3A–4C. Base stations 210 and 215 of cells 3 and 4 and base station 205 of CUT cell 2 are now configured to make uplink and downlink channel strength measurements of the channels on the CSSL, including the system-unique analog and DCCH channels.

Next, in step 555, the central computer 225 modifies the mobile-assisted handoff (MAHO) list for each of the measurement sectors 3A–4C. Typically, mobile stations serviced by a given sector transmit signal strength measurements of channels on the MAHO list to the base station of the given sector. Thus, according to the present invention, the central computer 225 modifies the MAHO list for each of the measurement sectors 3A–4C to include the system-unique DCCH channels associated with the CUT sectors 2A–2C.

Finally, in step 560, the central computer 225 modifies the interfering neighbor list (referred to as the FlexChan interfering neighbor (FIN) list in Lucent systems utilizing the FLCA feature) for each of the measurement sectors 3A–4C by adding the three system-unique DCCH channels assigned to the CUT sectors 2A–2C to the FIN list. Typically, mobile stations are prohibited to use any channels on the INL for commercial wireless communication. Thus, inclusion of the three system-unique DCCH channels on the FIN list for each of the measurement sectors 3A–4C prevents any mobile station serviced by a given measurement sector from using the system-unique DCCH channels for communication.

The present invention has been described above with reference to exemplary embodiments. Other embodiments will be apparent to those skilled in the art in light of this disclosure. The present invention may readily be implemented using configurations other than those described in the exemplary embodiments above. For example, the present invention may be utilized in mobile communication systems, such as paging systems, American AMPS (Advanced Mobile Phone System), English TACS (Total Access Cellular Systems), Scandinavian NMT (Nordic Mobile Telephone system), German C-Netz, IS-54/136 and IS-95 systems, wireless LAN's, and mobile satellite systems. In addition, the present invention may be utilized with various multiple access methods, such as frequency division multiple access (FDMA), time division multiple access (TDMA), code division multiple access (CDMA), or any combination of the multiple access methods. Therefore, these and other variations upon the exemplary embodiments are covered by the present invention.

What is claimed is:

1. A method for making switch-based C/I measurements for a wireless network including a plurality of cell sites, comprising steps of:
   (a) designating a first cell site of the plurality of cell sites as a cell-under-test (CUT) site, and sectors of other cell sites as measurement sectors;
   (b) configuring a set of system-unique analog frequencies and a set of system-unique dedicated control channel (DCCH) frequencies corresponding to the CUT site;
   (c) broadcasting from the CUT site carrier signals at the set of system-unique analog frequencies and interference signals at the set of system-unique DCCH frequencies;
   (d) measuring downlink signal strengths of the carrier signals at mobile stations located within an area serviced by the CUT site;
   (e) measuring signal strengths of the interference signals within areas serviced by the measurement sectors;
   (f) recording the signal strengths of the carrier and interference signals measured is steps (d) and (c); and
   (g) designating another cell site of the plurality of cell sites as the CUT site and repeating steps (b) through (f).

2. The method of claim 1, wherein;
   the CUT site comprises a plurality of CUT sectors;
   the set of system-unique analog frequencies comprises a plurality of different analog frequencies, each one of the plurality of different analog frequencies uniquely corresponding to one of the plurality of CUT sectors;
   the set of DCCH frequencies comprises a plurality of different DCCH frequencies, each one of the plurality of different DCCH frequencies uniquely corresponding to one of the plurality or CUT sectors; and
   the step of measuring downlink signal strengths of the carrier signals comprises measuring a signal strength of a selected one of the plurality of different analog signals corresponding to the CUT sector serviced by the measuring mobile station.

3. The method of claim 1, further comprising the step or repeating steps (b)–(g) until each one of the plurality of cell sites has been designated as the CUT site.

4. The method of claim, 1 wherein the step of measuring signal strength further comprises measuring downlink signal strength of the interference signals via a plurality of mobile stations serviced by the plurality of measurement sectors.

5. The method of claim 1, wherein the step of measuring signal strength further comprises measuring uplink signal strength or the interference signals via a plurality of base stations associated with the plurality of measurement sectors.

6. The method of claim 1, wherein the step of configuring system-unique DCCH frequencies further comprises the steps of:
   removing DCCH frequencies from service in the wireless network;
   returning the removed DCCH frequencies to the system-unique DCCH frequencies;
   restoring the system-unique DCCH frequencies to service in the wireless network; and executing an operational script that prohibits mobile stations in the wireless network from using the system-unique DCCH frequencies for voice communication.

7. The method of claim 6, wherein executing the operational script further comprises modifying a channel set list, a mobile-assisted handoff list, and an interfering neighbor list.

8. The method of claim 1, further comprising the step of generating a plurality of carrier signal strength to interference signal strength ratios to build a switch-based C/I matrix.

9. The method of claim 8, wherein generating a plurality of carrier signal strength to interference signal strength ratios further comprises generating average carrier signal strength to average interference signal strength ratios based upon a statistical analysis of the carrier signals and interference signals.

10. An electronic-readable medium having embodied thereon a program, the program being executable by a machine to perform a method for making switch-based C/I measurements for a wireless network including a plurality of cell sites, the method comprising steps of:
   (a) designating a first cell site of the plurality of cell sites as a cell-under-test (CUT) site, and sectors of other cell sites as measurement sectors;
   (b) configuring a set of system-unique analog frequencies and a set of system-unique dedicated control channel (DCCH) frequencies corresponding to the CUT site;
   (c) broadcasting from the CUT site carrier signals at the set of system-unique analog frequencies and interference signals at the set of system-unique DCCH frequencies;
   (d) measuring downlink signal strengths of the carrier signals at mobile stations located within an area serviced by the CUT site;
   (e) measuring signal strengths of the interference signals within areas serviced by the measurement sectors;
   (f) recording the signal strengths of the carrier and interference signals measured is steps (d) and (e); and
   (g) designating another cell site of the plurality of cell sites as the CUT site and repeating steps (h) through (f).

11. The electronic-readable medium of claim 10, wherein the method further includes a step of repeating steps (b)–(g) until each one of the plurality of cell sites has been designated as the CUT site.

12. The electronic-readable medium of claim 10, wherein the step of measuring signal strength further comprises measuring downlink signal strength of the interference signals via a plurality of mobile stations serviced by the plurality of measurement sectors.

13. The electronic-readable medium of claim 10, wherein measuring signal strength further comprises the step of measuring uplink signal strength of the interference signals via a plurality of base stations associated with the plurality of measurement sectors.

14. The electronic-readable medium of claim 10, wherein the step of configuring system-unique DCCH frequencies further comprises steps of:
   removing DCCH frequencies from service in the wireless network;
   retuning the removed DCCH frequencies to the system-unique DCCH frequencies;
   restoring the system-unique DCCH frequencies to service in the wireless network and;
   executing an operational script that prohibits mobile stations in the wireless network from using the system-unique DCCH frequencies for voice communication.

15. The electronic-readable medium of claim 10, further comprising the step of generating a plurality of carrier signal strength to interference signal strength ratios to build a switch-based C/I matrix.

16. a Cell Under Test (CUT) site configured to broadcast carrier signals at system-unique analog frequencies and interference signal at system-unique Dedicated Control Channel (DCCH) frequencies; a plurality of mobile stations configured to receive, measure, and transmit signal strengths of carries signals and interference signals; a plurality of measurement sectors configured to receive the transmitted signal strengths; and a processor configured to receive the signal strengths from plurality of measurement sectors, the CUT site and additional CUT sites, and to generate switch based C/I matrix, wherein the processor is further configured to perform a statistical analysis on the signal strengths to generate switch based C/I matrix.

17. The system of claim 16, wherein a measurement sector of the plurality of measurement sectors is configured to receive the transmitted interference signal strengths from a first set of mobile stations of the plurality of mobile stations located within an area serviced by the measurement sector.

18. The system of claim 16, wherein each measurement sector of the plurality of measurement sectors is configured to receive and measure the interference signals broadcast by the CUT site.

19. The system of claim 16, wherein the CUT site is configured to receive the transmitted carrier signal strengths from a second set of mobile stations of the plurality of mobile stations located within an area serviced by the CUT site.

20. A system for making switch-based C/I measurements for a wireless network including a plurality of cell sites, comprising:
   means for designating a first cell site of the plurality of cell sites as a cell-under-test (CUT) site, and sectors of other cell sites as measurement sectors;
   means for configuring a set of system-unique analog frequencies and a set of system-unique dedicated control channel (DCCH) frequencies corresponding to the CUT site;
   means for broadcasting from the CUT site carrier signals at the set of system-unique analog frequencies and interference signals at the set of system-unique DCCH frequencies;
   means for measuring downlink signal strengths of the carrier signals within an area serviced by the CUT site;
   means for measuring signal strengths of the interference signals within areas serviced by the measurement sectors; and
   means for recording the signal strengths of the carrier and interference signals measured.

* * * * *